United States Patent [19]
Hobson

[11] Patent Number: 4,846,486
[45] Date of Patent: Jul. 11, 1989

[54] COMBINED TROLLEY AND SEAT UNIT

[76] Inventor: Michael J. Hobson, Releath Water Farm, Releath, Helston, Cornwall, England

[21] Appl. No.: 123,152

[22] Filed: Nov. 20, 1987

[30] Foreign Application Priority Data

Nov. 20, 1986 [GB] United Kingdom ................. 8627713

[51] Int. Cl.$^4$ ............................................. B62B 1/02
[52] U.S. Cl. .............................. 280/47.25; 280/47.26; 280/47.33; 297/60
[58] Field of Search ..................... 280/30, 47.18, 47.24, 280/47.25, 47.26, 47.33; 182/33, 127; 297/60, DIG. 4; 248/129

[56] References Cited

U.S. PATENT DOCUMENTS

| | | | |
|---|---|---|---|
| 1,718,962 | 7/1929 | Kimball | 280/47.26 |
| 2,472,407 | 6/1949 | David et al. | 297/60 X |
| 2,699,557 | 1/1955 | Gravatt | 297/60 X |
| 2,990,764 | 7/1961 | Wilder | 182/127 X |
| 3,343,869 | 9/1967 | Scheinwald | 280/47.25 X |
| 3,997,213 | 12/1976 | Smith et al. | 280/47.18 X |
| 4,174,021 | 11/1979 | Barlock | 182/127 X |

FOREIGN PATENT DOCUMENTS 1194851 6/1970 United Kingdom .
2087317 5/1982 United Kingdom .
2161760 1/1986 United Kingdom .

Primary Examiner—Charles A. Marmor
Assistant Examiner—Michael Mar
Attorney, Agent, or Firm—Gifford, Groh, Sheridan, Sprinkle and Dolgorukov

[57] ABSTRACT

A combined trolley and seat unit has an inverted U-shape main frame with principal frame side members carrying ground-engaging wheels and having a main frame support rigidly fixed thereto and to a projecting bag support which carries the lower end of a bag the upper end of which is hooked by a pocket over a hook. A folding seat frame having a U-shape leg frame is pivotally carried on the main frame on the side thereof remote from the bag-like container and is movable between a folded position lying substantially parallel to the main frame and an unfolded position in which a front leg frame to which the seat frame is attached contacts the ground and the wheels are spaced from the ground to allow the unit to be used as a seat with no risk of rolling movement.

8 Claims, 4 Drawing Sheets

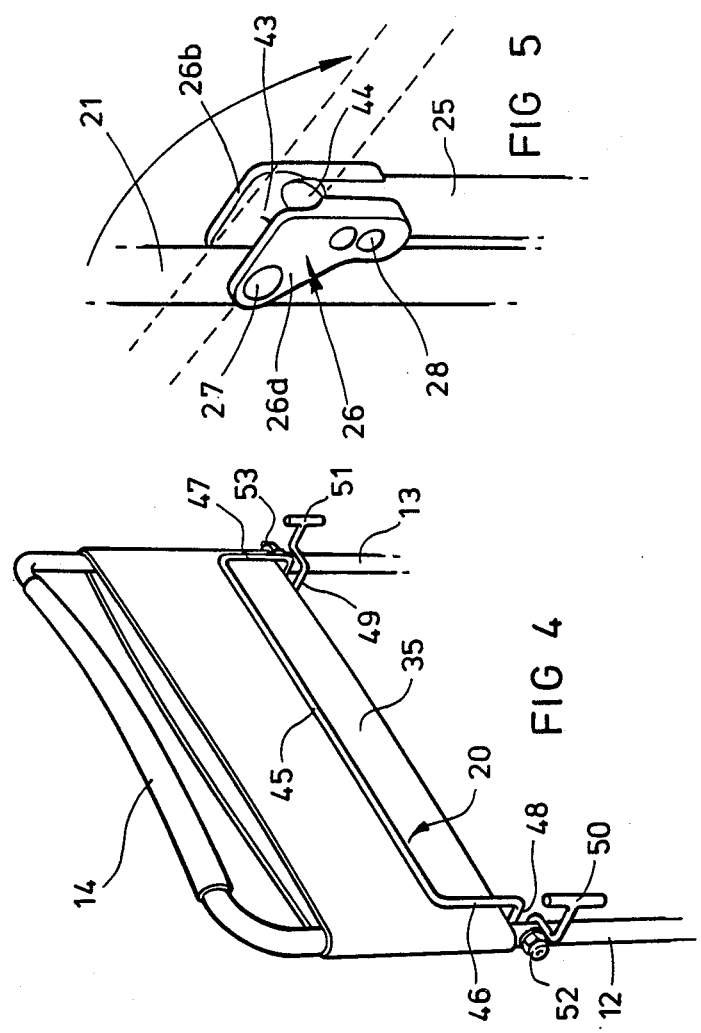

COMBINED TROLLEY AND SEAT UNIT

FIELD OF THE INVENTION

The present invention relates to a combined trolley and seat unit which may be used primarily as a trolley for conveying a load, with auxiliary seating means for enabling a user to rest in a seated position.

DESCRIPTION OF THE PRIOR ART

Combined trolley and seat units as such are known from the prior art. For example, British Pat. No. 1,194,851 describes a trolley and seat unit of this general type, comprising a main frame supported on wheels to which is attached a foldable seat frame enabling a user to rest in a seated position when the trolley is stationary. This earlier design, however, comprises no more than two generally U-shape frames hinged to one another and to the main planar trolley frame so that in the seat erected position the trolley wheels remain on the ground and constitute the sole contact between the trolley frame, now constituting a seat back, and the ground. Elderly or infirm users may thus find difficulty, having converted the trolley to a seat by erection of the seat frame, to position themselves in front of the seat and to lower themselves securely onto it without causing the seat to roll on the wheels, particularly if the trolley container is loaded since this then exerts a considerable moment about the wheels in a direction such as to raise the seat frame from the ground, and it is not entirely impossible that the trolley described in this earlier Patent may tip up when in the seat-erected position if the container is overloaded. The difficuly of rising from a seat liable to roll away before the occupant is fully balanced makes it entirely unsuitable for the elderly or infirm, or indeed for all but the most agile, and certainly would represent an unwanted risk to pregnant women.

Another earlier attempt to provide a combined seat and trolley unit is described in British Patent Application No. 2,087,317, which relates to an angler's trolley having two frame members pivotally attached to each other with one frame member being adapted to form a seat or support for a tackle carrier, and being provided with a downwardly extending group support. The wheels are carried on a vertical frame member which may be provided with a back rest. Here, although the seat is formed by two frames which are in contact with the ground in the seat erected position, it is achieved at the expense of convenience since the wheels are positioned on a sub frame spaced from the main frame on the side opposite that from which the seat unfolds so that, in use, both the container of the trolley and the foldable seat frame are on the same side of the main frame as one another, namely on the side opposite that of the sub-frame supporting the wheels. Erection of the seat frame thus necessarily involves removal of the trolley container, which must be then positioned on the ground separately from the seat. Clearly, this is a disadvantage in a structure designed to provide occasional rest for a person using a trolley to convey a load.

The most recent attempt at combining the two functions of shopping trolley and seat is shown in British Patent Application No. 2,161,760A, which describes a conventional slatted wooden folding seat to which wheels have been added on the front leg and to which a load carrier is fitted on one or both sides of the folding seat frame. Such a wooden folding seat, incorporating a pivoted A-frame side structure, clearly cannot conveniently be used as a shopping trolley due to its own inherent weight and the cumbersome nature of the folding frame using many frame parts. It further presents the disadvantage that, because the wheels are fixed to the inclined frame member they are spaced from the ground even when the unit is inclined at what would be the most convenient angle for use as a trolley and can only be brought into ground engaging contact by tilting the trolley through rather a steep and awkward angle.

OBJECT OF THE INVENTION

The present invention seeks to provide a combined trolley and seat unit which overcomes the disadvantages of the prior art trolleys discussed above.

SUMMARY OF THE INVENTION

According to the present invention, therefore, a combined trolley and seat unit comprising a main frame of tubular or rod-like frame members having ground-engaging wheels and means for supporting a load container on one side of the main frame and a folding seat frame of tubular or rod-like members pivotally mounted to the main frame on the opposite side from the load container support means, the seat frame carrying a flexible laminar seat which spans the seat frame members thereof, is characterised in that the said ground-engaging wheels are so mounted on the main frame that the unit can roll on the wheels when the seat frame is in its folded position but are substantially out of load-bearing contact with the ground when the seat frame is in its unfolded position whereby to permit a user to sit safely on the seat without risk of movement by rolling on the wheels, the arrangement being such that movement of the seat frame from the unfolded to the folded position moves the wheels automatically into contact with the ground whilst moving the seat frame from the folded to the unfolded position automatically displaces the wheels out of contact with the ground.

In a preferred embodiment of the invention the main frame comprises two generally parallel principal frame members joined at an upper end by a transverse handle member and spanned at or adjacent a lower end by a transverse support strut. One advantage which can be gained with the trolley unit of the invention is that it enables the height of the seat squab to be set sufficiently high for conventient use by elderly or infirm users without compromising on the compactness of the unit when collapsed.

The said transverse support strut may be constituted by an axle on which the said ground-engaging wheels are mounted, or may be separated from an axle on which the said ground-engaging wheels are mounted but located adjacently thereto.

In one embodiment the seat frame comprises a U-shaped member supporting a flexible fabric seat and pivotally attached at the free ends of the arms thereof to the main frame. Such collapsible seat frame further includes a generally U-shaped leg frame pivotally mounted to the U-shape seat frame at the free ends of the arms of the leg frame, such that the bight portion of the leg frame forms a ground-contacting foot of the leg frame.

In an alternative embodiment, however, the seat frame is formed by two generally U-shaped frame members pivotally attached together at an intermediate position along the lengths of the generally parallel arms, to form two cruciform assemblies the upper ends of which may be linked by a flexible seat panel which limits the turning movement of the two cruciform members when in the seat-erected position. In such a structure the two U-shaped frames defining the seat frame may be arranged such that one is narrower than the other by the thickness of the frame members so that when the two frames are folded together in the collapsed configuration the two frames lie co-planar with one another one frame lying entirely within the other.

The main frame of the unit may include a fixed support leg or a plurality of fixed support legs projecting from the plane defined by the said principal frame members of the main frame, for contact with the ground when the main frame is in the generally upright orientation which it adopts when the seat frame is in the erected position.

The said seat frame may further include a pair of side struts pivotally attached at one end to a respective main frame principal frame member and at the other end to a leg of the leg frame whereby to form, in effect, on each side of the unit, a quadrilateral linkage the four sides of which are consituted by the side strut, the leg of the leg frame, the adjacent side of the seat support frame, and the associated part of the principal frame member of the main frame.

The shape and dimensions of the members of each said quadrilateral linkage may be such that in the collapsed position of the seat frame the said U-shape leg frame lies substantially parallel to the plane defined by the main frame.

Whatever, the form of the seat frame, the said ground-engaging wheels may be carried on the said main frame in a position such that the major part, in excess of 50%, of a load applied to the main frame of the unit by an occupant of the seat in the seat-erected position is borne by the said fixed support legs such that there is no risk of rolling of the wheels when the unit is used as a seat.

Alternatively, however, the ground-engaging wheels may be carries on the free ends of the side struts projecting beyond their pivotal connection to the main frame whereby the wheels are displaced entirely out of contact with the ground upon erection of the seat frame. The said fixed support legs of the main frame may further be linked to a container support of the main frame.

Likewise, there may further be provided inter-engagement catches on the seat frame and/or on the main frame for retaining the seat frame in the collapsed and/or the erected positions. Particularly in the latter case, and if the ground-engaging wheels are carried directly on the main frame, the catches may act to hold the seat frame in the erected position regardless of the loads applied thereto by a seated user. Further, the dimensions of the seat frame may be such that the forces exerted on the pivotal joints of the frame both at the interconnections of its components and at the connection of the seat frame itself to the main frame, are applied in such a direction as to tend to move the seat frame towards the erected position rather than back towards the collapsed position. This can be achieved by ensuring that the pivotal movement of the frame members between a folded and an unfolded position passes an over-centre position before reaching an end stop defining the fully-extended configuration of the frame members.

BRIEF DESCRIPTION OF THE DRAWINGS

A better understanding of the present invention will be had upon reference to the following detailed description when read in conjunction with the accompanying drawings, which are provided purely by way of non-limitative example and in which:

FIGS. 4 and 5 are respective perspective views of two details of the embodiment of FIG. 2.

DETAILED DESCRIPTION OF THE PREFERRED EMBODIMENTS OF THE PRESENT INVENTION

Figure 1:
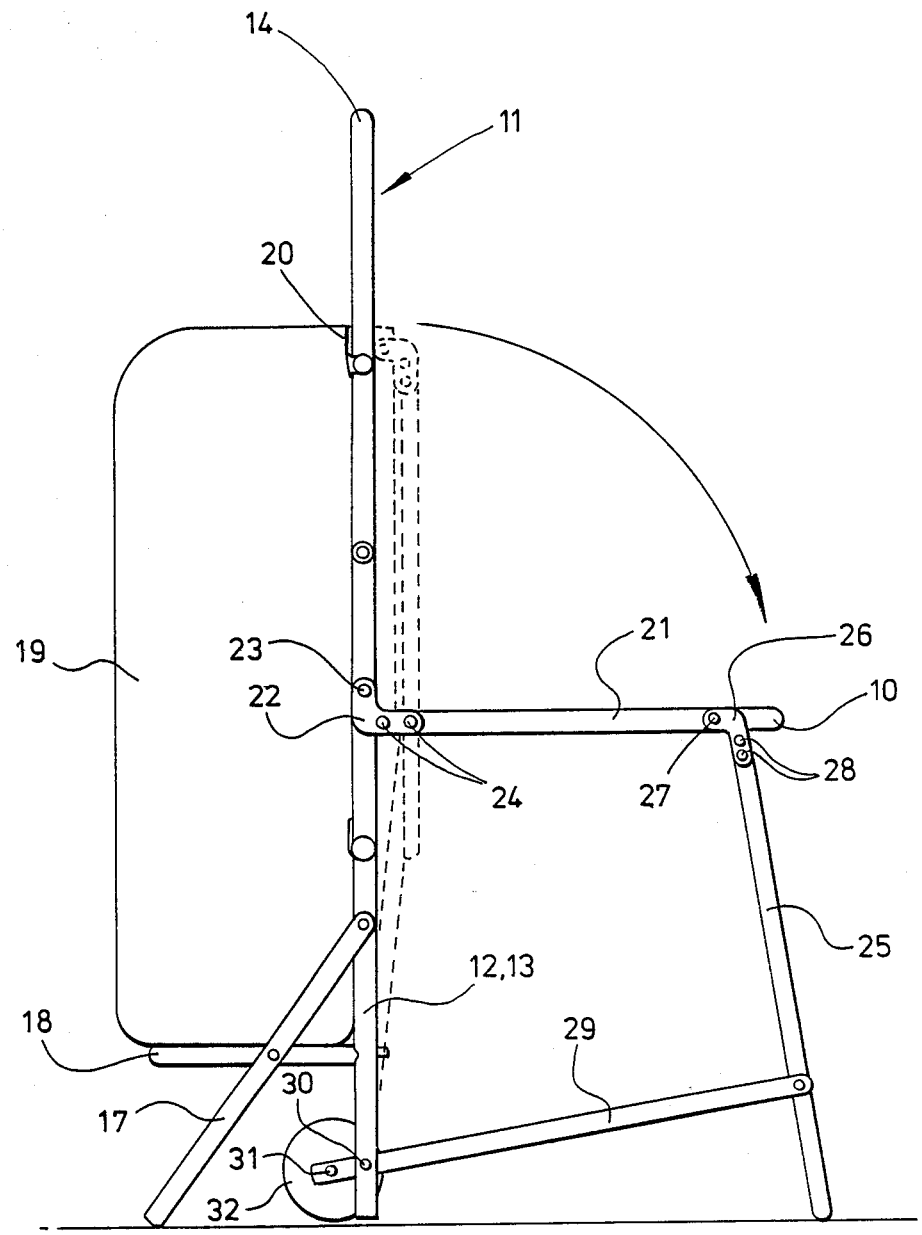
FIG. 1 is a schematic side view of a first embodiment of the invention.

Referring now to FIG. 1 the first embodiment shown comprises an inverted U-shape main frame generally indicated 11 having two principal side frame members 12, 13 joined at the top by a transverse handle member 14; the free ends of the side frame members being joined by a generally C-shape frame member 18 which acts to support the bottom of a bag-like container 19. Projecting to one side of the main frame 11 are two support legs 17 which are secured at their upper ends to respective principal side frame members 12, 13 and at an intermediate point to the projecting container support 18 which carries the load of the bag-like container 19, which latter is supported by means of a hook-shape retainer 20 on the main frame 11 over which a flap of the bag-like container 19 is hooked.

On the other side of the general plane defined by the members of the main frame 11 is a foldable seat frame assembly comprising a generally U-shape seat frame 21 pivotally connected to the main frame 11 by connector pivot brackets 22 having a transverse pivot pin 23 passing through the principal side frame members 12, 13 (respectively) of the main frame 11 and two rivets 24 securing the connector bracket 22 to the associated limb of the U-shape seat frame member 21. A U-shape front leg frame 25 is pivotally attached to the U-shape seat frame member 21 by further respective connector pivot brackets 26 pivotally attached to the seat frame 21 by respective pivot pins 27 and securely fixed to the free ends of the limbs of the U-shape leg frame 25 by rivets 28.

Connected between the lower ends of the leg frame 25 and the lower end of respective principal side frame members 12, 13 are respective support struts 29 which project beyond their pivotal connection at pivots 30 to the lower ends of the principal side frame members 12, 13. The projecting portion 31 of the support struts 29 carries a respective ground-engaging wheel 32 which, as can be seen in the configuration of FIG. 1, with the seat frame erected, is spaced from the ground so that the load applied to the ground by the seat frame due to the weight of an occupant on the seat frame is transmitted through the front-leg frame 15 and the rear legs 17 which are attached to the principal side frame members 12, 13 respectively and are held rigidly thereto by the triangular shape formed by the leg 17, the lower end of the principal side frame member 12, 13 and the associated limb of the container support 18 which also acts as a reinforcement for this purpose. It will be seen that the lower ends of principal side frame members 12, 13 are spaced a significant distance from the ground and never come into contact therewith since the act of folding the seat by turning the seat frame 21 about the pivot 23 causes the lower support struts 29 also to turn about the pivots 30 to bring the wheels 32 down into contact with the ground. In the folded position the unit stands on the wheels 32 and legs 17, whilst in the seat-open position it rests on the legs 17 and the front leg frame member 25.

It will be noticed that the seat frame 21 is so dimensioned that when folded its front edge 10 lies some way below the top limb 14 of the main frame 11 so that this can easily be gripped for use as a handle.

Figure 2:
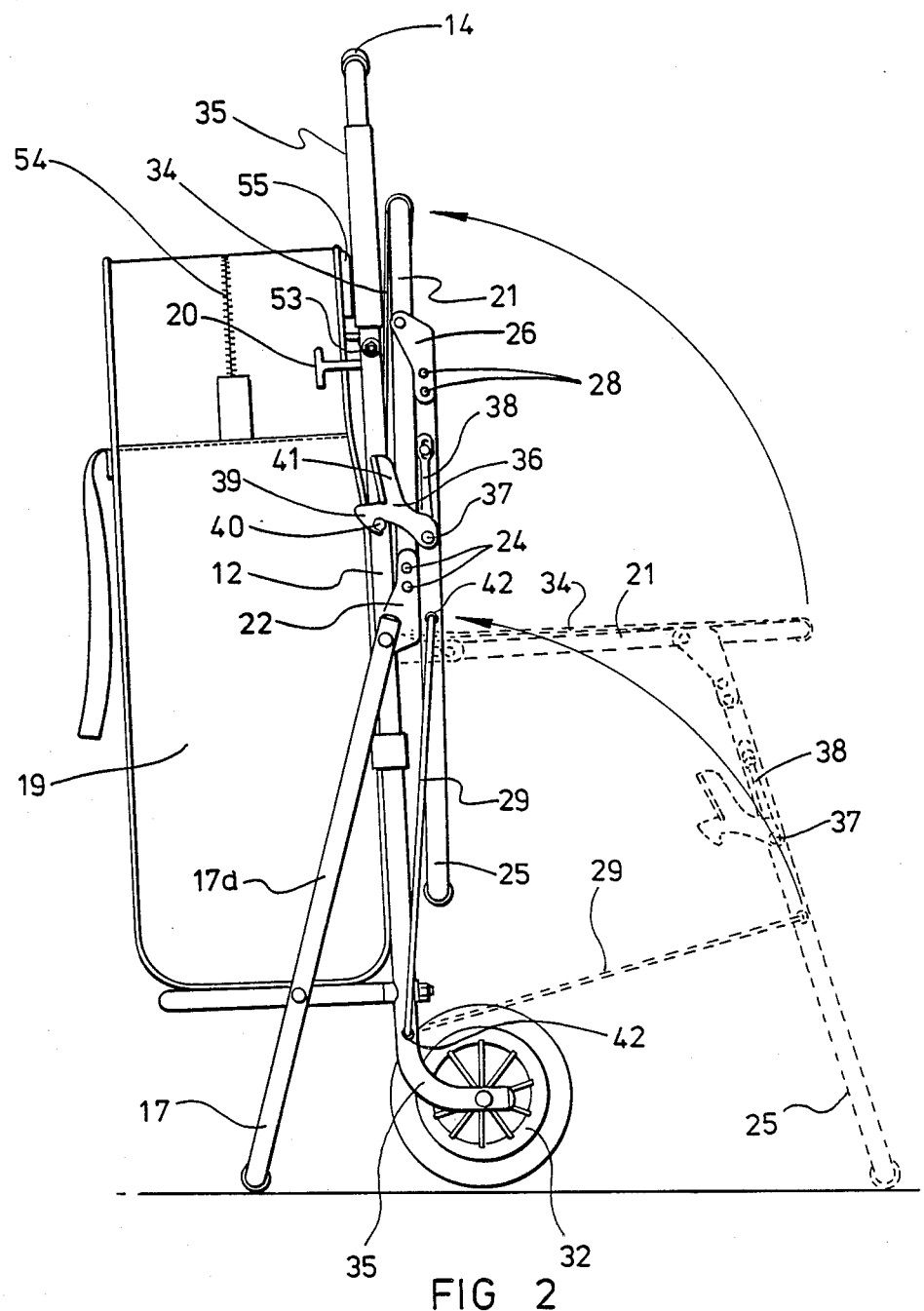
FIG. 2 is a similar side view of a second embodiment of the invention.

The alternative embodiment of FIG. 2 is similar to that of FIG. 1 and corresponding components have been identified with the same reference numerals. The embodiment of FIG. 2 differs from that of FIG. 1 in that the lower side struts 29 do not project beyond the pivotal connection at the pivot 30 to the principal side frame members 12, 13 and in that the ground-engaging wheels 32 are carried instead on a lower cranked projection 35 of the main frame principal side members 12, 13. Instead of being formed as separate legs 17 the main frame support 17 is in this embodiment formed as a U-shape frame the bight portion 17c of which rests on the ground as can be seen in FIG. 3.

Figure 3:
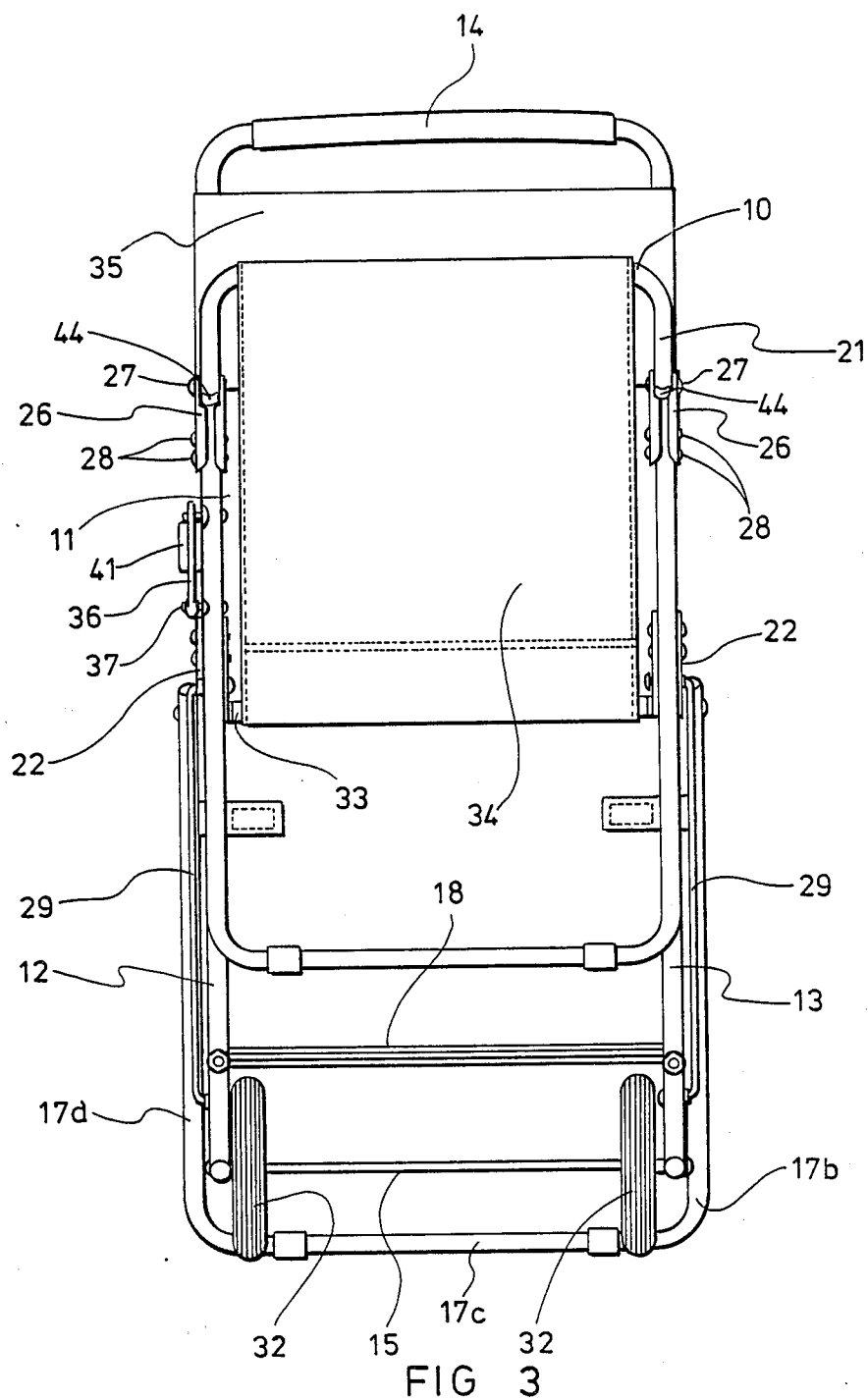
FIG. 3 is a front view of the embodiment of FIG. 1.

The rear leg frame 17, as can be seen in FIG. 3, has two parallel limbs 17a, 17b which are joined to the main frame side members 12, 13 at a point corresponding to the pivotal connection of the seat frame 21 to the main frame 11, and the inclination of the rear leg frame 17 matches that of the front leg frame 25 as will be seen from FIG. 2. In this embodiment, however, the pivot pin 23 is coaxial with a reinforcing rod 33 which forms the rear support for a seat panel 34 which is formed as a closed sleeve passing around the rear support 33 and the front or transverse limb 10 of the U-shape seat frame 21. A similar sleeve 35 passing around the two principal side members 12, 13 of the main frame 11 forms a seat back.

The two sleeves 34, 35 are formed from a nylon fabric reinforced with woven polypropylene on the inner sides of the sleeves. The polypropylene is substantially inextensible and substantially strengthens the nylon fabric. Again, the dimensions of the frame members are such that, in the erected or seat-unfolded position, the weight of an occupant on the seat frame is transmitted to the ground by the front leg frame member 25 and the main frame support 17 which, as mentioned above, is connected directly to the seat via the pivotal connection to the main frame 11 which also joins the main frame 11 to the seat rear member 33.

The component parts of the frame are retained in the collapsed or seat-folded position by means of a catch 36 which turns about a catch pivot 37 mounting the catch to the front leg frame 25. The seat catch 36 is biased by a catch spring 38 and has a catch hook 39 which can engage over a catch pin 40 on the principal side frame member 12. The seat catch 36 has a release lever 41 which can be turned by the user applying a force with finger or thumb in the direction of the seat unfolding movement to release the catch hook 39 from the catch pin 40 and allow the seat to be unfolded to the use position which is illustrated in broken outline in FIG. 2.

As can be seen from FIG. 2, with the seat frame 21 unfolded so that the front leg frame 25 rests on the ground, the wheels 32 are spaced from the ground and held above the straight line joining the lower ends of the front leg frame 25 and rear leg frame 17. The turning moment exerted by a user sitting on the seat 21 as he or she leans against the back panel 35 tends to turn the main frame 11 anti-clockwise as viewed in FIG. 2 which, since the main frame 11 is inclined slightly rearwardly in the seat-unfolded position, tends to bring the wheels 32 further from the ground thereby ensuring that in the seat-unfolded position the unit is entirely solidly standing on the ground with no possibility that it may roll away from a user lowering himself into the seated position or raising himself therefrom. The action of lifting the seat frame 21 from the seat-unfolded position illustrated in broken outline in FIG. 2, to the seat-folded position illustrated in solid outline in that Figure causes the ground-engaging wheels 32 to be lowered into contact with the ground so that the trolley unit rests on the wheels 32 and the rear leg frame 17 in this configuration. This also brings the main frame 11 to an entirely upright substantially vertical position (from the inclined position illustrated in FIG. 2 with the seat frame 21 unfolded) so that it is a simple matter to grip the handle 14 and use the trolley as a load bearing vehicle. When the handle 14 is released the trolley turns about the wheel 32 until the rear leg frame 17 contacts the ground and it then stands in an upright position as shown in FIGS. 2 and 3.

Various detail design points of the unit contribute to its considerable strength and light weight. The lower cranked projections 35 of the principal side frame members 12, 13 are curved to a large radius and the wheels 32 themselves are carried on an axle 15 spanning the free ends of the two lower cranked projections 35. The support struts 29 are fixed in bushes 42 which ensure that the strut 29 can turn with respect to the principal side frame members 11, 12 and the leg frame 25 without causing wear and, furthermore, are held securely in position without slack or play.

Likewise, as can be seen in FIG. 5, which illustrates the detail of a leg frame connector pivot bracket 26 it will be seen that this comprises two symmetrical generally triangular side members 26a, 26b having a part-cylindrical recess 43 for receiving the tubular member of seat frame 21 and corresponding recesses (not visible in FIG. 5) for receiving the leg frame member 25 to which the two side members 26a, 26b are riveted by the leg frame pivot bracket rivets 28. The end of the leg frame 25 is fitted with a shaped end piece 44 the upper surface of which conforms to the part-cylindrical curvature of the recess 43 to form a secure seating for the seat frame 21 in the seat-unfolded position and to terminate the leg frame 25 neatly preventing the ingress of water in inclement weather.

FIG. 4 illustrates the shape of the hook retainer 20 for the bag-like container 19. This hook shape retainer 20 has a main transverse rod-like limb 45 and two vertical end limbs 46, 47 joined by U-shape portions 48, 49 to respective T-shape projections 50, 51 having respective cross pieces which project both upwardly and downwardly from the stem portion thereof joining the T-shape projection to the U-shape portion. The T-shape projections 50, 51 can be used to carry a supermarket shopping basket (first collapsing the bag-like container 19 which is flexible enough to allow this) or to suspend the trolley unit as a whole from a supermarket trolley (again, first collapsing the bag-like container 19). The hook shape retainer 20 as a whole is secured in position on the principal side frame members 12, 13 by respective nut and bolt connectors 52, 53 passing through the U-shape portions 48, 49.

A zip fastener 54 closes the bag-like container 19 the upper portion of which has a downwardly open pocket 55 for receiving the hook-like retainer 20 to secure the container 19 in position on the trolley unit.

Having described my invention, many modifications thereto will become apparent to those skilled in the art to which it pertains without deviation from the spirit of the invention as defined by the scope of the appended claims.

I claim:

1. In a combined trolley and seat unit of the type comprising:
   a main frame including tubular or rod-like rod-like frame members,
   load container support means for supporting a load container on one side of said main frame,
   a folding seat frame of tubular or rod-like members,
   means pivotally mounting said folding seat frame to said main frame on the opposite side of said main frame from said load container support means for movement between folded and unfolded positions,
   a flexible laminar seat spanning seat frame members of said seat frame,
   leg frame means of tubular or rod-like frame members,
   means pivotally connecting said leg frame means to said seat frame, and
   ground-engaging wheels,
   the improvement comprising:
   main frame support means rigidly fixed to said main frame and said container support means and projecting from said main frame downwardly towards the ground thereby forming a triangular reinforcing sub-frame on said one side of said main frame,
   means mounting said ground-engaging wheels to said main frame, and
   said wheel mounting means and said main frame support means cooperatively interacting whereby when said seat frame is in its unfolded position, said wheel mounting means holds said wheels substantially out of load-bearing contact with the ground and said main frame support means and said leg frame means carrying the weight of said main frame to permit a user to sit safely on said seat without risk of movement by rolling on said wheels, and when said seat frame is moved from said unfolded to said folded position said wheel mounting means automatically moves said wheels into contact with the ground so that the weight of said main frame is carried by said wheels and said main frame support means.

2. The combined trolley and seat unit of claim 1, wherein said main frame comprises two generally parallel side frame members joined at an upper end by a transverse handle member and spanned at or adjacent a lower end by a transverse support.

3. The combined trolley and seat unit of claim 1, wherein said seat frame comprises a U-shape seat member supporting a flexible fabric seat, and pivotally attached at the free ends of the limbs thereof to said main frame.

4. The combined trolley and seat unit of claim 3, wherein said leg frame is generally U-shape and is pivotally connected to said seat frame by pivot connector brackets at the free ends of the limbs of said U-shape leg frame such that the ground-contacting part of said leg frame comprises the central portion joining said two limbs.

5. The combined trolley and seat unit of claim 4, wherein said leg frame is connected to one end of at least one side strut pivotally attached at the other end to one of said main frame side frame members whereby to form a quadrilateral linkage the four sides of which are constituted by said side strut, said front leg frame, the adjacent side of said folding seat frame and the associated part of said principal side frame members of said main frame.

6. The combined trolley and seat unit of claim 5, wherein the shape and dimension of each of the members of said quadrilateral linkage are such that in the folded position of said folding seat frame the U-shape front leg frame lies substantially parallel to the plane defined by said main frame and lower than an upper transverse member of said main frame spanning said side frame members thereof.

7. The combined seat and trolley unit of claim 1, wherein there is provided a seat catch on said folding seat frame and catch pin means on said main frame engageable by said seat catch for retaining said catch with said seat frame in said folded position.

8. The combined seat and trolley unit of claim 1, wherein said ground wheels are located between said leg frame and said main frame support and entirely above a straight line joining the ground-contacting ends of said front leg frame and said main frame support when said seat frame is in the seat-unfolded position thereof.

* * * * *